United States Patent
Leonard

(10) Patent No.: US 9,115,007 B2
(45) Date of Patent: Aug. 25, 2015

(54) RAINWATER TREATMENT UNIT

(75) Inventor: Owen Thomas Leonard, Dromahair (IE)

(73) Assignee: Ozone Industries Ireland Limited, County Wicklow (IE)

( * ) Notice: Subject to any disclaimer, the term of this patent is extended or adjusted under 35 U.S.C. 154(b) by 578 days.

(21) Appl. No.: 13/379,642

(22) PCT Filed: Jun. 29, 2010

(86) PCT No.: PCT/EP2010/059229
§ 371 (c)(1),
(2), (4) Date: Mar. 19, 2012

(87) PCT Pub. No.: WO2011/000842
PCT Pub. Date: Jan. 6, 2011

(65) Prior Publication Data
US 2012/0181235 A1    Jul. 19, 2012

(30) Foreign Application Priority Data

Jun. 29, 2009   (IE) .................................. S2009/0499

(51) Int. Cl.
*C02F 1/32* (2006.01)
*C02F 1/78* (2006.01)
(Continued)

(52) U.S. Cl.
CPC ... *C02F 1/32* (2013.01); *C02F 1/78* (2013.01); *C02F 9/005* (2013.01); *E03B 3/02* (2013.01);
(Continued)

(58) Field of Classification Search
CPC ............... C02F 9/00; C02F 1/32; C02F 1/78; C02F 1/001; C02F 1/50; C02F 2303/04; C02F 1/5236; C02F 1/281; C02F 1/72; C02F 2101/20; C02F 2209/005; C02F 2209/40; C02F 1/20; C02F 1/24; C02F 1/463; C02F 2209/02; C02F 2209/10; C02F 2301/043; C02F 2301/046; C02F 2301/08; C02F 2303/02; C02F 2303/10; C02F 2303/24; C02F 2305/023; C02F 2305/08; C02F 3/00; C02F 3/02; C02F 3/04; C02F 3/1215; C02F 9/005; C02F 2201/32; C02F 2201/322; C02F 2201/326; C02F 2301/04; C02F 1/008; C02F 1/283; C02F 2209/42; E03B 3/02
USPC ......................................................... 210/739
See application file for complete search history.

(56) References Cited

U.S. PATENT DOCUMENTS

| 5,683,576 A | 11/1997 | Olsen |
| 5,709,799 A | 1/1998 | Engelhard |

(Continued)

FOREIGN PATENT DOCUMENTS

| DE | 19515366 A1 * | 2/1996 | ................ E03B 3/03 |
| EP | 1 695 939 A1 | 8/2006 | |

(Continued)

OTHER PUBLICATIONS

Water awareness committee of monterey county, Rainwater Catchement, 2010, pp. 1-5.*

(Continued)

*Primary Examiner* — Lucas Stelling
*Assistant Examiner* — Rohit K Dewan
(74) *Attorney, Agent, or Firm* — Brian J. Colandreo; Michael T. Abramson; Holland & Knight LLP

(57) ABSTRACT

The present invention is directed to an assembly and a method of treating rainwater to produce potable water. A compact and easy-to-install apparatus is achievable as a result of a simple, yet highly effective sanitization method. Rainwater is entrained with a gas, and the entrained rainwater is irradiated with an ultraviolet (UV) light to fully sanitize the rainwater. The UV light is used during the irradiation of the entrained water and is also used to form a gaseous bactericide which is used to entrain the rainwater. None of the disadvantages of the prior art systems apply to any rainwater treatment systems which use this method. All of the connections between the component parts may be already provided for in this rainwater treatment unit, and consequently both installation and maintenance costs will be significantly reduced in comparison to the rainwater treatment systems which are known from the prior art.

5 Claims, 4 Drawing Sheets

(51) Int. Cl.
*E03B 3/02* (2006.01)
*C02F 9/12* (2006.01)
*C02F 9/00* (2006.01)
C02F 1/00 (2006.01)
C02F 1/28 (2006.01)
C02F 1/68 (2006.01)
C02F 103/00 (2006.01)

(52) U.S. Cl.
CPC .............. *C02F 1/001* (2013.01); *C02F 1/008* (2013.01); *C02F 1/281* (2013.01); *C02F 1/283* (2013.01); *C02F 1/68* (2013.01); *C02F 2103/001* (2013.01); *C02F 2201/3223* (2013.01); *C02F 2201/782* (2013.01); *C02F 2209/40* (2013.01); *C02F 2209/42* (2013.01); *C02F 2209/44* (2013.01); *C02F 2303/04* (2013.01); *C02F 2303/18* (2013.01); *C02F 2305/023* (2013.01)

(56) References Cited

U.S. PATENT DOCUMENTS

| | | | |
|---|---|---|---|
| 6,083,385 A * | 7/2000 | Benskin et al. | 210/192 |
| 6,090,294 A | 7/2000 | Teran et al. | |
| 6,182,453 B1 * | 2/2001 | Forsberg | 62/125 |
| 6,685,825 B1 | 2/2004 | Chang | |
| 2003/0024863 A1 * | 2/2003 | Gannon et al. | 210/134 |
| 2004/0007538 A1 | 1/2004 | Siriphraiwan | |
| 2008/0008632 A1 * | 1/2008 | Engelhard | 422/186.3 |
| 2009/0166296 A1 * | 7/2009 | Tigani et al. | 210/716 |

FOREIGN PATENT DOCUMENTS

| | | | | |
|---|---|---|---|---|
| EP | 1695939 A1 * | 8/2006 | | C02F 1/00 |
| WO | WO 2008030456 A1 * | 3/2008 | | C02F 1/78 |

OTHER PUBLICATIONS

Translation of DE 19515366 A1, 1994, pp. 1-4.*
International Search Report and Written Opinion issued in PCT/EP2010/059229 on Oct. 10, 2010.
International Preliminary Report on Patentability Issued in PCT/EP2010/059229 on Jan. 4, 2012.

* cited by examiner

RAINWATER TREATMENT UNIT

RELATED APPLICATIONS

The subject application is a U.S. National Stage Application of International Application No. PCT/EP2010/059229, filed on 29 Jun. 2010, which claims the priority of Irish Patent Application No.: S2009/0499, filed on 29 Jun. 2009, the contents of which are herein incorporated by reference in its entirety.

This invention relates to treating rainwater to produce potable water.

It has been known for many years to collect rainwater and treat the collected rainwater to allow the treated rainwater to be subsequently used by household appliances such as dishwashers, washing machines, toilets and other appliances. This type of water is known as grey water and does not need to be at the same hygienic standard as potable water. The majority of water consumed by households is used for grey water activities, and therefore the majority of water used by households does not need to be of a drinkable standard. Various methods and systems are known from the prior art which can treat rainwater to produce grey water. A number of these methods and systems are directed towards household installations which collect rainwater from coverings of the household and produce grey water which is to be used within that household. The methods and systems that are used to treat rainwater and produce grey water are very useful and, given that most households use quite a lot of grey water, these methods systems have also proven to be very effective in reducing the cost of providing water to households.

Moreover, many industrial processes require large amounts of water in order to carry out many types of process. In some circumstances, water is used as an ingredient or component of a particular product, and it may be the case that in these circumstances the water must be of a particular quality. However, in most cases, the water is used to assist with carrying out a particular step of the process, such as using the water as a coolant during a drilling step, or, using the water as a cleaning agent prior to an assembly or painting step. It has been found that grey water can be used for these purposes, and many prior art systems are known to collect rainwater and treat the rainwater to produce grey water for use in industrial processes.

It will be ready appreciated that whilst numerous methods and systems for producing grey water for both domestic and industrial use are known, these methods and systems are completely unsuitable for treating rainwater to produce potable water. The production of potable water from rainwater is far more difficult than the production of grey water from rainwater. The rainwater must be thoroughly treated to remove all bacteria which could be harmful to a person drinking the treated water. The sanitisation of the rainwater is crucial in the production of potable water from rainwater. Furthermore, it is also crucial that bacteria are prevented from developing in water which has already been treated and is awaiting subsequent use. In recent years, a number of methods and systems have been suggested to carry out treatment of rainwater in order to produce potable water.

One such method and system may be seen in the Applicant's own European Patent EP1 652 823. The method and system described in the patent are used for domestic purposes, to provide potable water to a dwelling. The method and system use a bactericide, ozone, which is injected into the rainwater at a preset time intervals in order to provide potable water for the dwelling. The system comprises a number of standard components that would be expected to be found in any rainwater treatment system such as guttering and other such rainwater guides and collection means which are all connected to a rainwater collection tank. Moreover, the treatment unit of the system comprises a number of components including a treatment tank, a pump, a control unit and various valves and level switches. As can be seen from the description of the system throughout the specification of the above-identified patent, a large number of component parts are required to be installed and connected to one another to provide the rainwater treatment system.

In addition to the system described above, there are several other rainwater treatment systems which are also known to produce potable water. Many of these systems also comprise a large number of separate component parts which lead to unwieldy systems which have quite an extensive footprint in terms of the amount of space which the systems occupy once they are installed. The large number of component parts that are located in different areas of the dwelling must be installed separately throughout the dwelling and thereafter the component parts are connected together to form the rainwater treatment system.

The installation of any rainwater treatment system is therefore a relatively large undertaking and it can be easily envisaged that a considerable amount of work is involved. Indeed, the installation of the system as shown in the aforementioned patent extends from the dwelling to an outhouse and also to an underground tank. The connections between these areas need to be installed and monitored over time to ensure that the connections are functioning appropriately. As there is a large amount of work which is required to connect all of these component parts of the rainwater treatment system to one another, the installation work is both costly and time consuming. Also, as different component parts of the system need to be located in different areas of the dwelling, this may require existing parts of the dwelling to be temporarily removed and/or re-located in order to allow the rainwater treatment system to be installed.

Moreover, due to the unwieldy nature of the rainwater treatment systems known from the prior art, this installation work will affect a number of different rooms and areas within and surrounding the dwelling. And thus, in addition to the cost and considerable amount of time which will be required for the system to be installed, the extensive amount of work will cause a large disturbance for anybody living in the dwelling during the installation period.

As briefly discussed above, the connections between the various component parts of the rainwater treatment system may extend from the dwelling to an outhouse and down to an underground storage tank. As a consequence, the connections between these component parts will be relatively lengthy and may be subjected to external weather conditions which could damage the connections over time. Monitoring and upkeep of the connections is therefore required for such prior art systems.

Yet a further disadvantage associated with the unwieldy size of current rainwater treatment systems is that some of the components are separated from other components by a relatively large distance. For example, the treatment unit of the rainwater treatment system may be located in an outhouse and the treated water storage tank may be located underground. In the aforementioned patent, both the treatment unit and the treated water storage tank require an ozone injector. The treatment unit requires the ozone injector in order to sanitise the rainwater and produce potable water, and, the treated water storage tank requires an ozone injector in order to maintain the treated water at a suitably hygienic standard for drinking. As the treatment unit and the treated water storage tank are located in separate areas from one another, two separate ozone injectors are required. Thus, two separate ozone sources are needed, or a single ozone source may be used however extensive piping to provide the ozone at the two separate locations will be required. It will be understood that other components of the rainwater treatment system will also have to be duplicated in the current rainwater treatment systems. This increases the cost of the rainwater treatment system. Additionally, current rainwater treatment systems are overly complex due to duplication of several component parts. As a result of this complexity, maintenance costs are increased and breakdowns are more likely to occur.

A more compact, simplified rainwater treatment system that is more convenient to install and easier to maintain is sought.

A further problem exists with the currently available rainwater treatment systems.

Many of these rainwater treatment systems comprise a treated water storage tank that holds treated water until it is required by the user. This treated water is supplied from the treated water storage tank, upon demand, to a potable water supply network. If the treated water remains stagnant in the treated water storage tank for too long, the hygienic quality of the treated water will become unsatisfactory. It is very important that control systems operate to maintain the hygienic level of the treated water.

As discussed above, it is known to provide UV lamps and/or aerators within the treated water storage tank to maintain the freshness and hygienic quality of the treated water whilst it is held in the treated water storage tank. However, it has also been suggested that the use of aerators and/or UV lamps in the treated water storage tank is not sufficient to maintain the hygienic quality of the treated water if the treated water is kept for a long period of time in the treated water tank. Thus, these solutions are not seen as being ideal as the quality of the treated water becomes unsatisfactory, even in the presence of the UV lamp and/or aerator, if the water is stagnant for a long period of time, as will occur when a household or industrial facility is empty during a holiday period.

It is common for numerous rainwater treatment systems to be installed for use in non-primary residential homes and as such these homes are vacant for long periods of time. Therefore, any treated water that is in the treated water storage tank becomes undrinkable as the treated water will be left stagnant for a long period of time, and bacteria will develop in the stagnant treated water. The use of aerators and/or UV lights to freshen the treated water at preset intervals is not effective enough in preventing bacteria growth if the entire body of treated water in the treated water tank is stagnant for a relatively long period of time.

It is a goal of the present invention to provide a rainwater treatment apparatus and method that overcome at least some of the above mentioned problems.

STATEMENTS OF INVENTION

The present invention is directed to a method of treating rainwater to produce potable water, the method comprising the steps of storing collected rainwater in a rainwater holding tank; supplying the collected rainwater from the rainwater holding tank through an inlet of a rainwater treatment unit; entraining the rainwater with a gas; irradiating the entrained rainwater with ultraviolet (UV) light to fully sanitise the rainwater; storing the sanitised water in a treated water tank in the rainwater treatment unit; pumping the sanitised water from the treated water tank through an outlet of the rainwater treatment unit.

The advantage of entraining the filtered rainwater with a gas to partially sanitise the rainwater, and, then irradiating the entrained rainwater with UV light to fully sanitise the rainwater is that the rainwater is fully sanitised to a high hygienic level which is of a potable water standard using two simple steps. The gas freshens the rainwater and the UV sanitises the entrained water. As the method is carried out using these simple but effective steps, the method can be easily implemented within a compact rainwater treatment unit which is small and easy to install. None of the disadvantages of the aforementioned prior art systems will apply to any rainwater treatment systems which use the claimed method. No extensive connections are required between component parts of the rainwater treatment system, nor are large amounts of installation work needed for the rainwater treatment system as this simplified method can be encased within a single rainwater treatment unit which is delivered on-site as a single unit and simply comprises an inlet for rainwater and an outlet which supplies potable water. All of the connections between the component parts are already provided for with in this rainwater treatment unit, and consequently both installation and maintenance costs will be significantly reduced in comparison to the rainwater treatment systems which are currently known.

In a further embodiment, the step of entraining the filtered rainwater with a gas comprises entraining the rainwater with a bactericide that is formed using the UV light.

The advantage of entraining the rainwater with a bactericide that is formed using the UV light is that the UV light may be used in both the production of the bactericide and also as an irradiator. Thus, the employment of the same UV light to carry out two separate tasks allows a more compact and less wieldy rainwater treatment system to be constructed. The UV light does not have to be duplicated within the rainwater system and therefore the overall footprint of the rainwater treatment unit will be reduced as fewer component parts are required. As this method avoids any duplication of component parts within the rainwater treatment system, the cost of the overall rainwater treatment system will be reduced. As only one UV light is required to irradiate and to create the bactericide, the running costs associated with the rainwater treatment system will be lower when compared with known, conventional rainwater systems.

In a further embodiment, the bactericide is ozone formed by circulating air or oxygen adjacent the UV light.

In a further embodiment, the step of irradiating the entrained rainwater comprises passing the entrained water adjacent a quartz tube which encases the UV light. This is seen as a particularly advantageous feature as it allows for a significantly compacted and small component part to generate the bactericide and act as an irradiator in the rainwater treatment unit.

In a further embodiment, the method further comprises the steps of monitoring the amount of water in the rainwater holding tank; and, increasing the amount of water in the rainwater holding tank by adding water from a supplementary water supply in response to the amount of water in the rainwater holding tank decreasing below a pre-determined amount of water.

This is an advantageous step for the method to carry out as the rainwater treatment system will not run out of water to pass through the rainwater treatment unit, as either rainwater which has been collected or water which has then supplied to the rainwater holding tank will be used to supply the rainwater treatment unit.

In a further embodiment, the method further comprises the steps of assessing the condition of the sanitised water in the treated water tank; and, upon assessment of the sanitised water to be in a non-ideal condition, pumping water from the rainwater holding tank into the rainwater treatment unit to intentionally cause an overflow condition in the treated water tank and re-circulate the non-ideal sanitised water through at least part of the rainwater treatment unit.

This is advantageous as the treated water will be maintained at a satisfactory level of hygienic quality by re-circulating the treated water through the treatment process. The treated water is never allowed to become stagnant in the treated water tank to the point where harmful bacteria is allowed to develop within the treated water. This methodology is also advantageous as it allows the treated water to be maintained at a high level of hygiene and quality without requiring a separate aerator and/or irradiator in the treated water storage tank. The same aerator and/or irradiator which are used to initially sanitised water are also used to maintain the treated water at a satisfactory level of hygiene. The re-use of these component parts in the rainwater treatment unit avoid any duplication of component parts, thus reducing the cost of the rainwater treatment unit and also allow the rainwater treatment unit to be provided in a compact casing which is easy to install and relatively simple to maintain in comparison to the extensive prior art rainwater treatment systems which, when installed, have a large footprint.

In a further embodiment, the non-ideal sanitised water is re-circulated through an overflow conduit connected to the treated water tank and is passed back into the rainwater holding tank.

In a further embodiment, the method further comprises the steps of assessing the condition of the sanitised water in the treated water tank; and, upon assessment of the sanitised water to be in a non-ideal condition, pumping water out of the treated water tank to be re-circulated through at least part of the rainwater treatment unit. This also prevents wastage of water as the unsatisfactory water is passed back to the rainwater holding tank.

In a further embodiment, the non-ideal sanitised water is re-circulated into the rainwater treatment unit prior to the step of entraining the filtered rainwater.

In a further embodiment, the non-ideal sanitised water is re-circulated into the rainwater treatment unit prior to the step of irradiating the entrained rainwater.

The present invention is further directed towards a rainwater treatment assembly for producing potable water from rainwater, the assembly comprising a rainwater holding tank and a rainwater treatment unit, wherein, the rainwater treatment unit comprises an inlet connected to an inlet filter to remove any unwanted particles from the rainwater; an aerator which is connected to the inlet filter, whereby the aerator receives filtered rainwater from the inlet filter and entrains the filtered water with a gas; an irradiator that is connected to the aerator, the irradiator comprising an ultraviolet (UV) light source to irradiate the entrained water and fully sanitise the rainwater; a treated water tank connected to the irradiator to store the fully sanitised water; and, a supply pump within the treated water tank to pump the sanitised water through an outlet filter to an outlet of the rainwater treatment unit.

The rainwater treatment unit may be provided by a small and compact unit which is easy to install. In this manner, many of the disadvantages associated with the large and unwieldy rainwater treatment systems which are known from the prior art can be obviated. The rainwater treatment unit comprises an inlet to receive rainwater and comprises an outlet which supplies potable water from the rainwater treatment unit. Thus, the rainwater treatment unit is comprised of a single unit which already has all of the requisite connections between the component parts such as the aerator, the irradiator, the treated water storage tank and the supply pump. Moreover, in further preferred embodiments, flow meters, input and output particle filters, controlled valves and a control unit may be also be supplied within the rainwater treatment unit with all of the requisite connections in place. For example, the control unit may preferably receive data from various component parts such as water level units, flow meter units, pumps, pressure measurement devices and the like in order to assess the general operational state of the rainwater treatment unit and react accordingly by opening or closing valves, or initiating a pump operation and the like.

In a further embodiment, the gas entraining the filtered rainwater comprises a bactericide that is formed using the UV light source.

This is seen as a particularly advantageous feature as the UV light may be used to form the bactericide as well as be used as the irradiator. Therefore a UV light is not duplicated within the rainwater treatment unit and the associated cost of the rainwater treatment unit will be consequently reduced. Moreover, less maintenance will be required and the running cost of the rainwater treatment unit will be lower. Most significantly however, as the duplication of the component part is avoided, a compact and small rainwater treatment unit may be designed which can be installed in a single location within a dwelling or an industrial facility. This will greatly reduce installation costs and installation time in comparison with prior art rainwater treatment systems. As the amount of time required to install the rainwater treatment system will be greatly shortened, the disturbance to any people living in the dwelling or any persons using the industrial facility will also be greatly reduced.

In a further embodiment, the bactericide is ozone formed by circulating air or oxygen adjacent the UV light source.

In a further embodiment, the UV light source is encased within a quartz tube so as to allow the entrained water to flow adjacent the quartz tube and become fully sanitised by the irradiator.

In a further embodiment, the assembly further comprises a monitoring unit to monitor the level of water in the rainwater holding tank and a supplementary water supply valve which may be opened to increase the amount of water in the rainwater holding tank by adding water from a supplementary water supply.

In a further embodiment, the assembly further comprises an overflow pipe connected to the treated water tank and which is also connected to the supplementary water supply via the supplementary water supply valve.

In a further embodiment, the assembly further comprises a control unit to assess a hygienic condition of the sanitised water in the treated water tank, and, a rainwater supply pump capable of pumping water from the rainwater holding tank into the rainwater treatment unit so as to cause an intentional overflow condition in the treated water tank and re-circulate the water in the treated water tank back through at least part of the rainwater treatment unit.

This is seen as a particularly simple yet effective way of ensuring that the treated water which is stored in the treated water tank does not become stagnant and can be re-circulated throughout the rainwater treatment system. No additional aerators or irradiators required within the treated water tank, and therefore the duplication of component parts is again obviated. There will be associated financial savings in the procurement, installation, maintenance and operation of the rainwater treatment system.

In a further embodiment, the assembly further comprises an overflow conduit from the treated water tank which leads to the rainwater holding tank. This is seen as a simple way to direct the sanitised water from the treated water tank and re-circulate the sanitised water back through the rainwater treatment system. This requires very little additional piping and assists in keeping the rainwater treatment unit to be a compact, small and easy-to-install unit.

In a further embodiment, the assembly further comprises a control unit to assess a hygienic condition of the sanitised water in the treated water tank, and, a re-circulation pump to re-circulate the sanitised water through at least part of the rainwater treatment unit.

In a further embodiment, the re-circulation pump supplies sanitised water from the treated water tank to the aerator.

In a further embodiment, the re-circulation pump supplies sanitised water from the treated water tank to the irradiator.

Depending on the amount of time that the treated water has remained stagnant within the treated water tank, it may only be necessary to pump the treated water into the irradiator to allow the UV light to freshen the treated water. By only passing the treated water through the irradiator to freshen the water, the running costs of the rainwater treatment system will be lower when compared with other embodiments which re-circulate the treated water through the entire system.

DETAILED DESCRIPTION OF EMBODIMENTS

The invention will be more clearly understood from the following description of some embodiments thereof, given by way of example only with reference to the accompanying drawings, in which.

Figure 1:
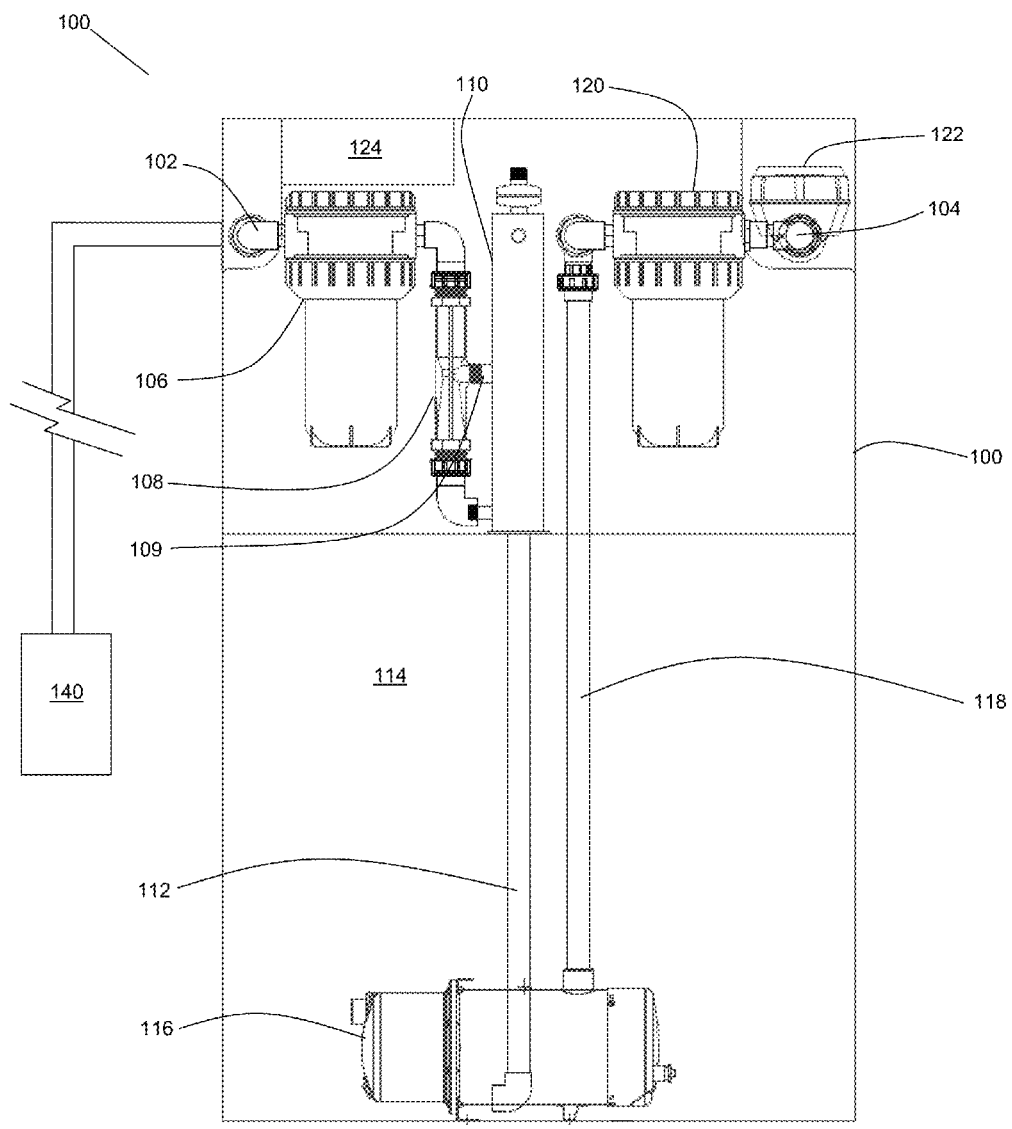
FIG. 1 is a diagrammatic side view of a rainwater treatment unit in accordance with the present invention.
Figure 2:
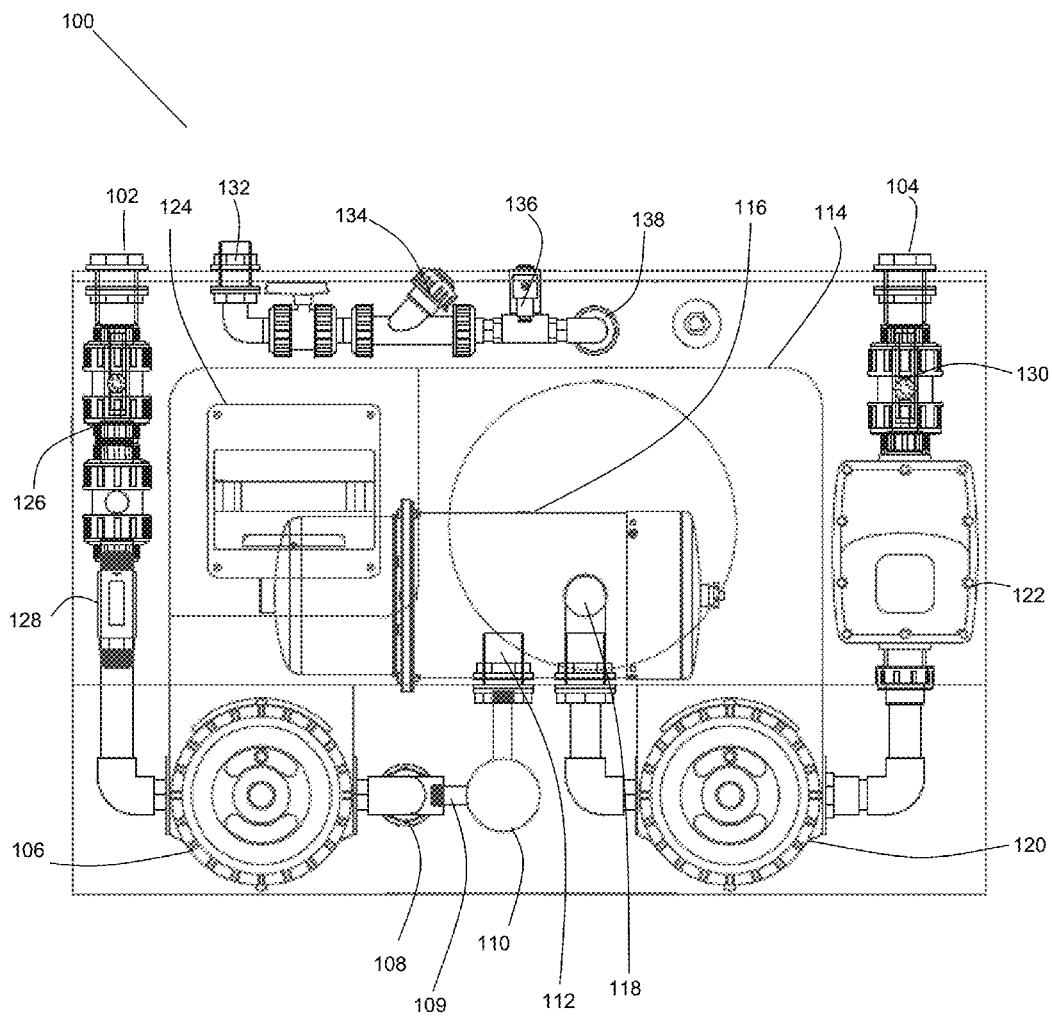
FIG. 2 is a diagrammatic plan view of the rainwater treatment unit of FIG. 1.

Referring to FIGS. 1 and 2, there is provided a rainwater treatment unit indicated generally by the reference numeral 100. The rainwater treatment unit 100 comprises an inlet 102 and an outlet 104.

Rainwater is collected in a conventional manner using guttering, piping and the like and is delivered to a rainwater holding tank 140. Such a system may be seen in the applicant's own granted European Patent EP 1 652 823 B1. The rainwater is supplied from the rainwater holding tank to the rainwater treatment unit 100, preferably by means of a pump (not shown). The rainwater is fed into the rainwater treatment unit 100 via the inlet 102. An input valve 126 is provided for ease of maintenance of the rainwater treatment unit 100. A flow meter 128 is provided to ensure that an optimum flow rate is being achieved by the pump (not shown). A particle filter 106 is used to remove any unwanted particles in the rainwater. The filter size of this filter may be preferably five microns or less. The filtered rainwater is then fed into an aerator that is embodied by a venturi injector 108. Alternatively, the aerator may be an air injection pump or a snifter valve. The venturi injector 108 entrains the filtered rainwater with a gas. The gas is input into the venturi injector 108 through a gas inlet 109. In a preferred embodiment, the gas comprises ozone although it will be understood that other gases such as air may also be used to entrain the filtered rainwater. The entrained filtered water is fed into an irradiator 110. In the embodiment shown, the gas inlet is connected to the irradiator 110 however it will be understood that the gas inlet may be open ended to allow air to be drawn into the venturi injector 108.

Figure 4:
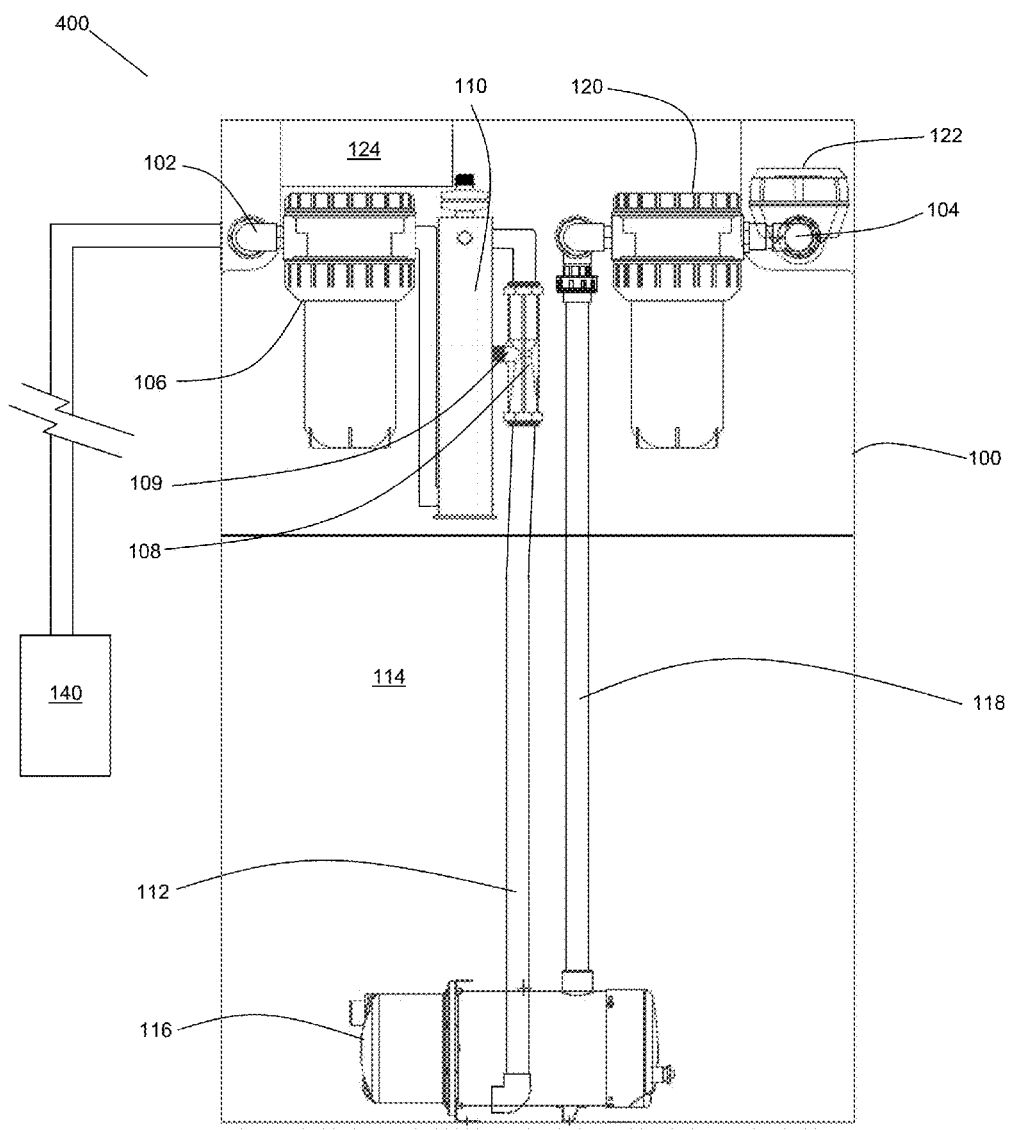

In a further embodiment, as shown in FIG. 4 the filtered rainwater may be fed into an irradiator 110. The irradiated water is then fed to an aerator that is embodied by a venturi injector 108. The venturi injector 108 entrains the filtered rainwater with a gas. The gas is input into the venturi injector 108 through a gas inlet 109. In a preferred embodiment, the gas comprises ozone although it will be understood that other gases such as air or oxygen may also be used to entrain the filtered rainwater. Alternatively, the aerator may be an air injection pump or a snifter valve. The entrained, irradiated water flows down a treated water tank feed pipe 112 into a treated water tank 114.

Figure 3:
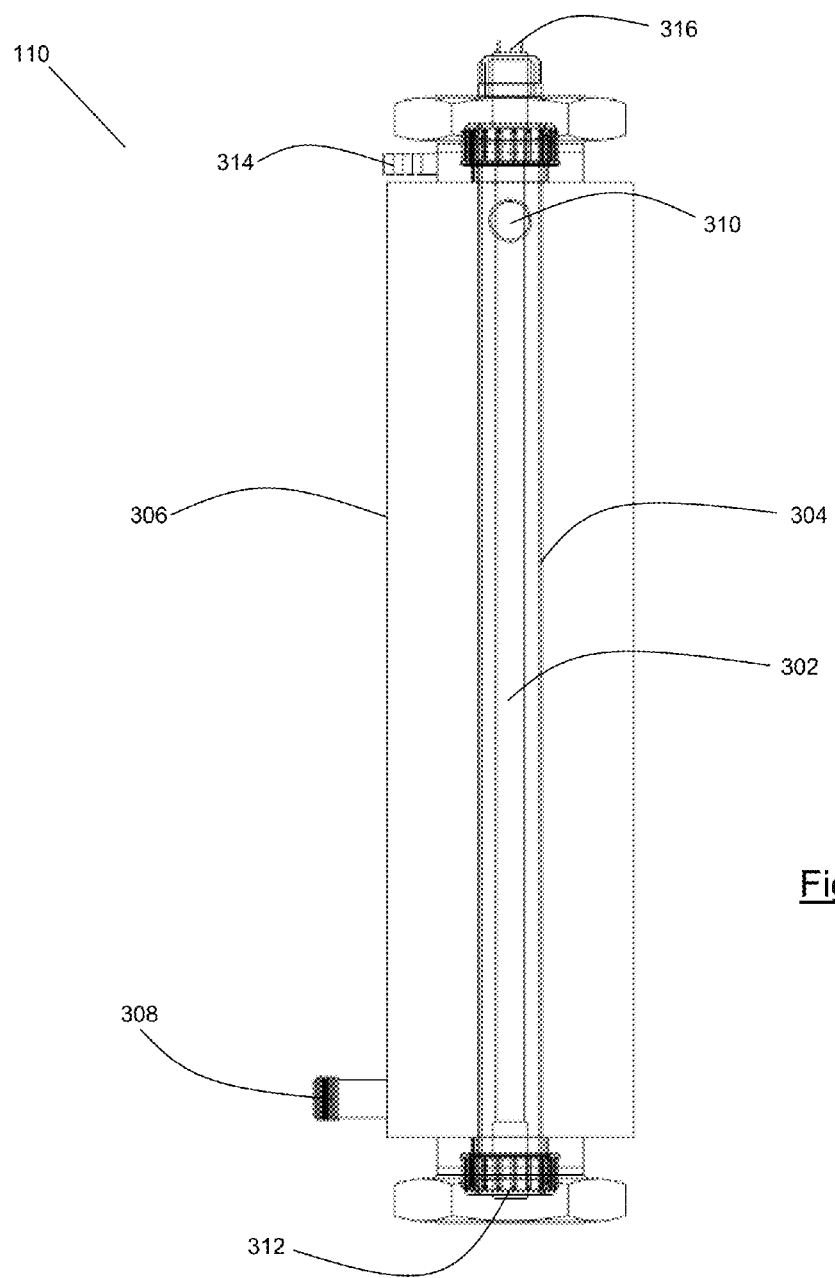
FIG. 3 is a diagrammatic front view of an irradiator used in the rainwater treatment unit of FIG. 1; and, FIG. 4 is a diagrammatic side view of a rainwater treatment unit in accordance an alternative embodiment of with the present invention.

Referring now to FIG. 3, where like parts previously described have been assigned the same reference numeral, the irradiator 110 comprises an ultraviolet (UV) light source 302 which is housed within a quartz tubing 304 within a casing 306 of the irradiator 110. A water inlet 308 is arranged at a lower portion of the casing 306 of the irradiator 110, and a water outlet 310 is arranged at an upper portion of the casing 306 of the irradiator 110. The water outlet 310 is directed (into the page) in a perpendicular fashion in relation to the water inlet 308. A gas inlet 312 is arranged beneath the casing 306, and a gas outlet 314 is arranged above the casing 306 of the irradiator 110. The UV light source 302 is used to create ozone by passing air, or oxygen, in though the gas inlet 312, over the UV light source 302 within the quartz tubing 304, and out the gas outlet 314. The UV light source 302 is used to sanitise the entrained filtered water by passing the entrained filtered water though the water inlet 308, along the length of the irradiator 110, between the casing 306 and the quartz tube 304, and out the water outlet 314. The quartz tubing 304 is sealed so that no liquid passing through the irradiator 110 can enter the interior of the quartz tube 304. An electrical connection 316 is also shown for the UV light source 302.

The oxygen in the air is converted into ozone by creating free radicals of oxygen in the air and allowing these free radicals to join with oxygen molecules in the air:

$$O_2 + UV \rightarrow 2O$$

$$\Rightarrow 2O + 2O_2 \rightarrow 2O_3$$

The ozone ($O_3$) is entrained into the filtered rainwater to partially sanitise the rainwater. The entrained filtered rainwater, that is partially sanitised, is then fed into the irradiator 110 and flows outside of the quartz tubing 304. Ultraviolet rays from the UV light source pass through the quartz tubing 304 and irradiate the entrained filtered rainwater. This irradiation process completes the sanitisation of the entrained filtered rainwater.

Referring to FIGS. 1 and 2 again, treated water is output from the irradiator 110 and flows down a treated water tank feed pipe 112 into a treated water tank 114. The treated water remains in the treated water tank 114 until it is required by a potable water supply (not shown). A pump 116 pumps treated water through an outlet filter 120 via an outlet filter feed pipe 118. The outlet filter 120 may preferably comprise carbon, Zeolite or other such minerals in order to improve the taste of the treated water by acting as a catalyst to convert any residual ozone into oxygen, and/or to add minerals to the water to improve the taste. Moreover, colloidal silver, minerals or metal removal components may also form part of the outlet filter 120 in order to remove contaminants, such as lead, that may not have been removed by the process.

The treated water is delivered through the outlet 104 to the potable water supply. An isolation outlet valve 130 is arranged adjacent the outlet 104, and a pump control unit 122 is arranged adjacent the isolation outlet valve 130. The pump control unit 122 is used to control either the operation of the pump 116 or is used to supply water at a predetermined output pressure through the outlet 104. For example, 2 bar would be a typically outlet pressure. The components used to control the speed of the pump 116 are either located in the pump control unit 122 or a controller unit 124.

The controller 124 is used to control the pump 116. The controller may also be used to monitor the level of rainwater in the rainwater holding tank 140 by means of a level indicator (not shown). The controller may top-up the amount of rainwater in the rainwater holding tank 140 with water from a supplementary water supply, such as a mains water supply. A mains supply inlet 132 is connected to a conventional mains supply. If the controller 124 detects that the rainwater has dropped below a predetermined threshold, a mains supply valve 136 is actuated by the controller to allow a flow of water from the mains supply flow into the rainwater holding tank 140. In a preferred embodiment, a filter 136 is situated intermediate the mains supply inlet 132 and the mains supply valve 136. Thus, with the mains supply, an acceptable amount of water will always be available to be input to the rainwater treatment unit 100 from the rainwater holding tank 140.

In a preferred embodiment, the water from the mains supply is added to the rainwater holding tank 140 by feeding the water through an overflow pipe 138 which leads from the rainwater treatment unit 100 back to the rainwater holding tank 140. An opening (not shown) in the treated water tank 114 leads to the overflow pipe 138.

Furthermore, the controller 124 may also monitor the quality and/or quantity of the treated water being held in the treated water tank 114. If the quality of the treated water falls below an acceptable level and become unsatisfactory, or non-ideal, then the controller will act to remove the unsatisfactory treated water from the treated water tank 114. The unsatisfactory treated water is forced to flow through at least part of the rainwater treatment unit 100 again. In a preferred embodiment, the unsatisfactory treated water is fed back to the rainwater holding tank 140 by feeding the water through the overflow pipe 138 which leads from the rainwater treatment unit 100 back to the rainwater holding tank 140. Thus, an intentional overflow is created by pumping water into the rainwater treatment unit 100 and thus causing the treated water tank 114 to overflow. The overflow is fed down the overflow pipe 138 and recently treated water replaces the stagnant treated water which had become unsatisfactory. The treated water is refreshed as a result.

The controller starts and stops the inlet pump (not shown) and/or the ozone generator in the form of the UV light source 302 which is used to create ozone by passing air, or oxygen, in though the gas inlet 312, over the UV light source 302 within the quartz tubing 304, and out the gas outlet 314.

It is envisaged in further embodiments to switch off the mains supply inlet using the mains supply valve 136 whilst this refresh process is occurring.

The controller 124 can assess the quality of the treated water by assessing the duration of time since rainwater was fed into the rainwater treatment unit 100. Flow meters (not shown) may be optionally located at the inlet 102 and outlet 104 of the rainwater treatment unit 100, as well as, prior to and subsequent to other components in the rainwater treatment unit 100 such as the particle filter 106, the venturi injector 108, the irradiator 110, the pump 116, the outlet filter 120.

In further embodiments (not shown), it is envisaged that the overflow pipe 138 may be connected to the input of the particle filter 106, the venturi injector 108 and/or the irradiator 110. In such an embodiment, the unsatisfactory treated water does not re-circulate through the entire rainwater treatment unit 100. This will reduce the operational running cost of the rainwater treatment unit 100.

In the specification the terms "comprise, comprises, comprised and comprising" or any variation thereof and the terms "include, includes, included and including" or any variation thereof are considered to be totally interchangeable and they should all be afforded the widest possible interpretation.

The invention is not limited to the embodiments hereinbefore described which may be varied in both construction and detail within the scope of the appended claims.

The invention claimed is:

1. A method of treating rainwater to produce potable water, the method comprising:
   storing collected rainwater in a rainwater holding tank;
   supplying the collected rainwater from the rainwater holding tank through an inlet of a rainwater treatment unit;
   filtering the rainwater through a filter;
   irradiating the filtered rainwater with ultraviolet (UV) light;
   entraining the irradiated rainwater with a gas to fully sanitise the rainwater;
   storing the sanitized water in a treated water tank through an outlet of the rainwater treatment unit;
   pumping the sanitized water from the treated water tank through an outlet of the rainwater treatment unit;
   whereby, the method further comprises:
      assessing the condition of the sanitised water in the treated water tank; and, upon assessment of the sanitized water to be in a non-hygienic condition, pumping water from the rainwater holding tank into the rainwater treatment unit to intentionally cause an overflow condition in the treated water tank and re-circulate the non-hygienic sanitized water in the treated water tank back through at least part of the rainwater treatment unit.

2. A method of treating rainwater as claimed in claim 1, wherein the method further comprises:
   monitoring the amount of water in the rainwater holding tank; and,
   increasing the amount of water in the rainwater holding tank by adding water from a supplementary water supply in response to the amount of water in the rainwater holding tank decreasing below a pre-determined amount of water.

3. A method of treating rainwater as claimed in claim 1, wherein the non-hygienic sanitised water is re-circulated through an overflow conduit connected to the treated water tank and is passed back into the rainwater holding tank.

4. A method of treating rainwater as claimed in claim 1, wherein the non-hygienic sanitised water is re-circulated into the rainwater treatment unit prior to entraining the irradiated rainwater.

5. A method of treating rainwater as claimed in claim 1, wherein the non-hygienic sanitised water is re-circulated into the rainwater treatment unit prior to irradiating the filtered rainwater.

* * * * *